E. E. SLICK.
TRUCK SIDE FRAME.
APPLICATION FILED MAR. 7, 1917.
1,263,616.
Patented Apr. 23, 1918.
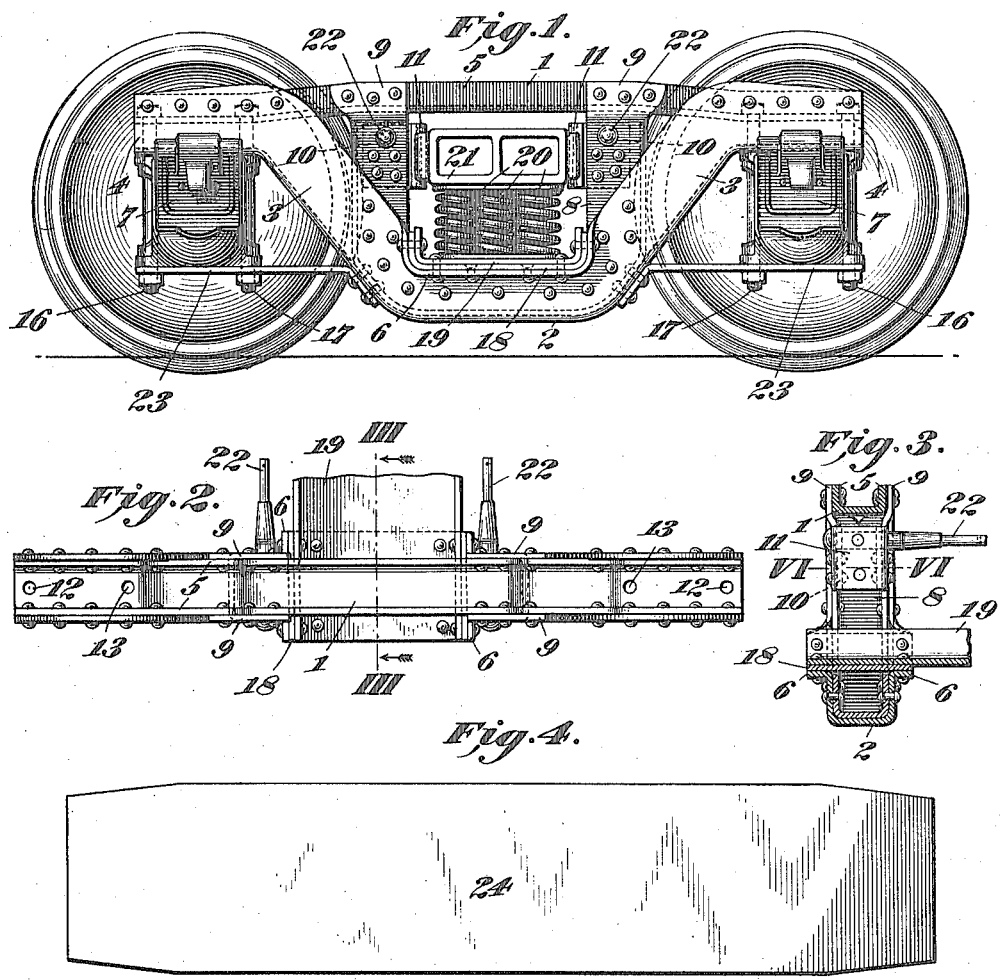
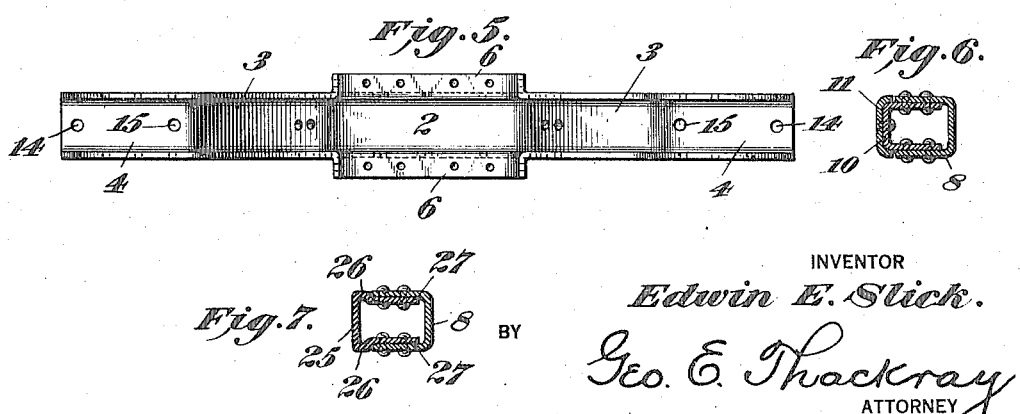
INVENTOR
Edwin E. Slick.
BY
Geo. E. Thackray
ATTORNEY

UNITED STATES PATENT OFFICE.

EDWIN E. SLICK, OF WESTMONT BOROUGH, PENNSYLVANIA.

TRUCK SIDE FRAME.

1,263,616. Specification of Letters Patent. Patented Apr. 23, 1918.

Application filed March 7, 1917. Serial No. 152,979.

*To all whom it may concern:*

Be it known that I, EDWIN E. SLICK, a citizen of the United States, and a resident of the borough of Westmont, county of Cambria, and State of Pennsylvania, (whose post-office address is Johnstown, Pennsylvania,) have invented certain new and useful Improvements in Truck Side Frames; and I do hereby declare the following to be a full, clear, and exact description of the invention, such as will enable others skilled in the art to which it appertains to make and use the same.

My invention relates to improvements in car trucks and particularly those which are adapted to support heavy freight or other cars and refers generally to that part of the car truck composing the truck side frame which I make of wrought or rolled iron or steel, parts of which may be pressed into final shape and secured together in various ways.

By making my truck side frame of rolled steel of proper and known qualities, I provide a material which, by reason of its method of manufacture, inspection and tests, is sure to be solid and integral throughout each part thereof in such a way that each member is best adapted to withstand the stresses and strains to which it may be subjected in use. I may secure the various portions together by bolts, welding, hot driven or cold driven rivets, but prefer to use rivets which are solidly driven by heavy pressure into holes drilled through the solid metal of the contiguous parts or punched with holes considerably smaller than their finished size and then drilled or reamed so that each hole is smooth and of uniform size throughout.

I preferably construct the lower member of my truck side frame from a plate of rolled steel which is approximately rectangular and with parallel sides, except that the ends may be cut off on a slight taper or bevel if desired, to reduce the weight and size of the end portions. This member may be rolled or pressed into general U-section with the web portion below and the flanges extending upwardly therefrom, the intermediate portion of the flanges also being flanged outwardly to form a broader portion for the spring seat which supports the springs on which the ends of the bolsters rest. This lower member is formed substantially in the shape of a V with, however, a straight lower portion connecting the two slanting portions, the end portions being substantially horizontal and parallel to the lower portion and adapted to rest upon the tops of the journal boxes. My top member may be composed of a channel-shape section either made of rolled or pressed steel, as desired, and of such width that it may be nested within the ends of or between the flanges of the lower member and securely riveted thereto through and by means of the contiguous flanges. I also provide another brace member for the truck side frame, the general form of which is U-shape and in addition to this the cross section of the same is generally of U-shape with flat lower or web portions, and this member is adapted to be nested within the lower portion of the bottom arch bar member and the upper portions of this brace member are adapted to be secured to the flanges of the upper arch bar member. I thus provide a truss construction which is amply braced in all directions and able to withstand the stresses to which it is subjected while thus providing a frame which is as light as or lighter than a frame of any other construction adapted to carry the same load. In addition to the foregoing portions, I also provide the usual spring seat, pedestal tie-bars, column guides, brake-hanger supports and journal-box bolts.

Having thus given a general description of my invention, I will now refer to the annexed sheet of drawings in which like characters refer to like parts:—Figure 1 is a side elevation of a railway truck provided with a side frame embodying my invention; Fig. 2 is a top plan view of the side frame; Fig. 3 is a transverse sectional elevation taken on the line III—III of Fig. 2; Fig. 4 is a plan view of a plate from which the lower or inverted arch bar is formed; Fig. 5 is a top plan view of the lower or inverted arch bar after it has been formed in the desired shape; Fig. 6 is a transverse section through the truck column and guide taken on the line VI—VI of Fig. 3; and Fig. 7 is a transverse section through the truck column and guide, showing a modified form of column guide.

Referring now to the various characters of reference on the drawings:—1 represents the top member or upper arch bar which is shown as of channel section, which channel may be either first rolled and then cambered or bent to a slight degree as shown, or it may be formed from a flat plate which is pressed into the shape shown. 2 represents the bottom member or lower arch bar in general and this is of channel section with a web portion, as illustrated, and with two flanges projecting substantially parallel and in the same direction therefrom. This lower member may first be rolled of channel section with a web and two flanges, as illustrated, and then bent into the shape shown in Fig. 1 and the flanges then formed thereon to provide supports for the spring seat, or it may be pressed from a flat plate of rolled steel indicated as 24 in Fig. 4. This lower member is provided with portions 3 which incline upwardly from each end of the lower portion thereof and with substantially horizontal end portions 4, the lower parts of which are adapted to rest on top of the journal boxes as illustrated. The upper arch bar 1 is provided with side flanges 5 which are nested within and secured to the ends of the lower member by rivets, as illustrated, and also secured to the truck column member 8 by rivets passing through the flanges 5 and the portions 9 of the truck column, as illustrated. Flanges 6 are formed integrally on the lower portion of the inverted arch bar 2, adapted to receive the spring seat plate 18 secured thereto by rivets, as illustrated. The journal boxes are illustrated at 7. The truck columns 8 are formed of channel section which may be either rolled or pressed from a plate and then bent into U-shape, as illustrated, the sides extending vertically and the bottom member being nested within and secured to the contiguous portions of the lower arch bar member by means of rivets, as illustrated. This truck column 8, by reason of its construction and the fact that it is firmly secured to the inverted arch bar and also firmly riveted through its flanges 9 by a number of rivets to the upper arch bar, forms a very efficient brace which adds materially to the strength of the structure, while, at the same time, serving to support the column guides 10 and 11 which retain the bolster in its up and down movements and also prevent the motion of the bolster laterally. It will be noted that the upper web portions of the sides of the truck column guides or those sides farthest removed from the center, have been split and bent out, thereby allowing another rivet to be used passing through this portion and the contiguous flange 5 of the upper arch bar member, thereby providing a very rigid and strong construction; this construction being clearly illustrated in Figs. 1 and 3. The column guide 10 is preferably formed of a bent plate inserted between the flanges of the truck column 8 and riveted thereto, as shown, the inner ends of which project toward the bolster and form a guide therefor. On these column guides I may apply a wear plate 11 riveted thereto by countersunk rivets, in order to provide a smooth surface, as illustrated in Fig. 6, or I may make the column guide in one piece, as illustrated in Fig. 7, in which the lateral guiding edges of the column guide are 26, the flanges or legs are 27, the modified form of column guide itself in general being indicated at 25. In the ends of the upper arch bar I provide bolt holes 12 and 13 and in the ends of the lower arch bar I provide bolt holes 14 and 15, which are adapted to receive bolts 16 and 17 which secure the journal boxes to the truck side frame and which also secure the pedestal tie-bars 23 thereto. 19 is a spring plank which is of channel section, one end being riveted to one side frame and the other to the companion side frame on the other side of the truck, this spring plank thereby holding the two side frames squarely together to make them act harmoniously in service. The springs which are shown as of helical form are illustrated at 20, the bolster is 21, the brake hanger carrier is 22, while the pedestal tie-bars are 23. In order to obtain the maximum amount of stiffness and strength at the end of my side frame, I prefer to nest the upper member within the lower member with their webs spaced apart, as illustrated particularly in Fig. 1.

Although I have shown the upper arch bar member 1 with its flanges 5 projecting upwardly, as in this position it is more easily secured to the flanges of the lower arch bar member, as illustrated, I may also arrange the upper member 1 with its flanges 5 projecting downwardly and with its web portion forming the upper part of the truck frame, as on account of the considerable space within the ends of my truck frame I can introduce riveting tools therein and secure the parts when they are placed together in this latter manner. In this case I may also make the upper arch bar member of width sufficient so that its flanges may overlap and be outside of the flanges of the lower arch bar member. One of the particular features of my invention consists in forming the various members of trough or channel section and nesting portions of the same within portions of the other members and securing them together by their contiguous sides, as illustrated.

Although I have shown the upper arch bar member 1 as of channel or trough section with its flanges projecting upwardly, I may make it of other sections, such as rectangular, square bar, I-beam, box-shape or other shape as may be readily understood.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. A truck frame comprising an upper arch bar and a lower arch bar, each of trough section, the ends of one member being nested within the ends of the other with their webs spaced apart and their flanges contiguous and secured together.

2. A truck frame comprising an upper arch bar and a lower arch bar, each of trough section, comprising a web and two flanges, one being fitted or nested within the other at the end portions with their webs spaced apart and their flanges directly contiguous and secured together thereby.

3. A truck frame comprising an upper arch bar and a lower arch bar, each of trough section, comprising a web and two flanges, one being fitted or nested within the other at the end portions with their webs spaced apart and their flanges contiguous and secured together.

4. A truck frame comprising an upper arch bar and a lower arch bar, each of trough section comprising a web and integral flanges, the end portions of said flanges being contiguous and secured directly together, and the web portions spaced apart.

5. A truck frame comprising a lower arch bar of trough section with upwardly projecting flanges, an upper arch bar of trough section with upwardly projecting flanges, the ends of said arch bars being nested one within the other and secured together by means of their contiguous flanges, their central portions being spaced apart, a brace member secured to both, and a spring seat formed on the lower member.

6. A truck frame comprising a lower arch bar member of trough section, with its flange portions projecting upwardly, an upper arch bar member of trough section with its flanges projecting upwardly, the ends of said members being nested one within the other and secured together by their contiguous flanges, said members being spaced apart at their central portion, a truck column member of general U-shape inserted between the central portions of said members and secured to both.

7. A truck frame comprising a bottom arch bar member of trough section, an upper arch bar member of trough section, the end portions of said members being secured together by means of their contiguous flanges, a truck column member of trough section of general U-form with a lower horizontal portion and two upwardly projecting side portions, the lower portion being nested within the lower arch bar member and the upper portions having parts which overlap the sides of the upper arch bar and means for securing the same together.

8. A truck frame comprising a lower member of trough section bent into an extended V with a substantially horizontal lower portion, two upwardly and outwardly inclined side portions and substantially horizontal end portions, an upper arch bar member of trough section with flanges extending upwardly, the ends of same being nested within and secured to the end portions of the lower member by means of their flanges, integral outwardly projecting flanges on the intermediate portions of the said lower member, thereby forming a spring seat.

9. A truck frame comprising a lower member and an upper member both of trough section, the ends of said members being nested one within the other and secured together by their contiguous flanges, said members being spaced apart at their intermediate portions, a column guide of trough section with a longitudinally extending lower portion and upwardly extending side portions, the lower portion being nested with the intermediate portion of said lower member and secured thereto, the upper portions of the flanges of said column guide overlapping the flange portions of the upper member and secured thereto.

10. A truck frame comprising a lower arch bar of channel section with upwardly projecting flange portions, a longitudinally extending lower portion, side portions extending inclined upwardly and outwardly therefrom with substantially horizontal end portions; an upper arch bar of trough section with upwardly extending flanges, the ends of which are nested within the ends of the lower arch bar and secured thereto by means passing through their contiguous flange portions; an outwardly projecting integral flange on both sides of the lower portion of said lower arch bar, adapted to form a spring seat; a column guide of trough section bent around three sides of a rectangle, the lower portion of which is nested within and conforms to the shape of the intermediate portion of the lower arch bar, the upper portions of said column guide being adapted to overlap the flanges of the upper member and means for securing the same together.

11. In a truck frame of the character described, a column guide member of trough section with a horizontal lower portion, upwardly extending side portions, the upper ends of the web of which are bent outwardly in the plane of the flange portions, whereby they are adapted to contact with and be secured to the upper arch bar.

12. In a truck frame of the character described, a column guide comprising a trough section formed in the shape of a U, with a laterally extending lower portion, and upwardly extending side portions, the flanges thereof projecting inwardly, and means for securing same to the lower and upper members by means passing through the flange portions.

13. In a truck frame of the character described provided with a column guide having integral bottom and side portions of trough section, a bolster guide formed of a bent plate inserted between the flanges and projecting inwardly thereof, the projecting portion of same being adapted to serve as a bolster guide.

14. A truck side frame comprising top and bottom members of trough sections, spaced apart at their center and with their flanges directly adjacent at their end portions the webs being spaced apart, the ends of both members being secured together by means of their contiguous flanges and means passing through said members adapted to secure the same on the journal boxes.

15. A truck frame comprising an upper arch bar, a lower arch bar of trough section, the ends of the upper arch bar being nested within the ends of the lower arch bar, the end portions of the flanges contiguous and the end portions of the web spaced apart, said bars being secured together by means passing through their contiguous flange portions.

16. In a truck frame of the character described, having an upper arch bar and a lower arch bar, the lower arch bar comprising a trough section, the intermediate portion of the flanges of which are bent outwardly at an angle with the other portions thereof.

In testimony whereof I hereunto affix my signature.

EDWIN E. SLICK.

Copies of this patent may be obtained for five cents each, by addressing the "Commissioner of Patents, Washington, D. C."